United States Patent [19]
Lamere et al.

[11] Patent Number: 4,947,358
[45] Date of Patent: Aug. 7, 1990

[54] NORMALIZER FOR DETERMINING THE POSITIONS OF BITS THAT ARE SET IN A MASK

[75] Inventors: Virginia C. Lamere, Upton; Elaine H. Fite, Northboro; Francis X. McKeen, Westboro, all of Mass.

[73] Assignee: Digital Equipment Corporation, Maynard, Mass.

[21] Appl. No.: 325,928

[22] Filed: Mar. 20, 1989

[51] Int. Cl.⁵ .............................................. G06F 7/00
[52] U.S. Cl. .............................................. 364/715.04
[58] Field of Search .... 364/715.04, 748, 200 MS File, 364/900 MS File

[56] References Cited

U.S. PATENT DOCUMENTS 4,236,206 11/1980 Strecker et al. ................... 364/200
4,785,421 11/1988 Takahashi et al. ............. 364/715.04
4,794,557 12/1988 Yoshida et al. ..................... 364/748

OTHER PUBLICATIONS

L. Dadda, "On Parallel Digital Multiplier", Associazione Elettrotecnica ed Elettronica Italiana, 1976, pp. 126–132.

Primary Examiner—Gary V. Harkcom
Assistant Examiner—Tan V. Mai
Attorney, Agent, or Firm—Kenyon & Kenyon

[57] ABSTRACT

A normalizer that identifies the bits that are set in input data and generates output signals representing the positions of the set bits in the input data. The normalizer has a device arranged to receive an n-bit signal. Each of the bits of the n-bit signal are either set or clear. The normalizer operates iteratively, and during each iteration: determines an end most set bit; generates a signal representing position information for this end most set bit; and clears the end most set bit that was identified during the immediately previous iteration. The normalizer also includes a novel bit counter that provides a count of the number of bits set in the input data.

6 Claims, 2 Drawing Sheets

NORMALIZER FOR DETERMINING THE POSITIONS OF BITS THAT ARE SET IN A MASK

FIELD OF THE INVENTION:

The present invention relates to the field of digital computers, and more particularly to a normalizer device used in the execution of macroinstructions such as a procedure call instruction.

BACKGROUND OF THE INVENTION:

A digital data processing system comprises three basic components: a memory, an input-output element and a processor. The manner in which the components of the computer system interact with one another and operate to process data is typically controlled through the use of an instruction set.

One type of instruction of the instruction set which is frequently used in computer systems is a procedure call instruction.

Procedures are general purpose routines which may be called by a process running on the computer system for execution in connection with the data processing operations of the processor. The procedure uses an argument list which is passed to it by the processor and further uses local variables for data storage. The procedure call instruction controls the computer system to save the contents of all of the general purpose registers of the processor which the procedure uses. The procedure call instruction also passes an argument list to the procedure. It performs other operations required to run the subroutine and preserves the desired state of the processor upon return from the procedure. The procedure terminates with a return instruction to transfer control from the procedure to the process running on the computer system which called the procedure through execution of the call procedure instruction. The return instruction restores the state of the machine and returns control to the calling program.

In one known architecture, the call instruction specifies the entry point in the memory of the procedure which is a data item, typically a word, called an entry mask. The entry mask is a sequence of bits wherein each of a certain set of the bits within the mask represents a corresponding general purpose register of the processor to be saved during the running of the procedure. If a particular bit of the entry mask is set, the contents of the corresponding general purpose register are to be saved or restored on a subroutine or procedure call using the procedure call and return instructions. Generally, the contents of a general purpose register must be saved if the called procedure will alter the contents of that general purpose register.

In one known system, the contents of the general purpose registers which are to be saved during the running of a called procedure are temporarily stored in a call frame on a memory stack. A memory stack is an area of memory set aside for temporary storage of data. The stack uses a last in/first out concept so that as data items are added to (pushed on) the stack, a stack pointer decrements and as data items are retrieved from (popped off) the stack, the stack pointer increments. The stack pointer comprises a general purpose register which contains the address of the top (lowest address) of the processor-defined stack. A call frame is a data structure built on the stack during a procedure call to store the contents of various general purpose registers identified in the entry mask. The call frame starts from a location contained in a frame pointer (a general purpose register which contains the base address of the call frame built on the stack) and expands to lower addresses. The contents of the general purpose registers identified in the entry mask are pushed on the call frame in numerical order at the beginning of a call procedure and are popped off for return to the corresponding general purpose registers upon a return from the procedure.

Upon the call of a subroutine, the entry mask is read to identify the registers that need to be saved. The accessibility of the memory space needed for storing the contents of these registers must also be determined upon reading the mask. This is done by counting the number of set bits in the entry mask to determine the total number of registers that need to be saved. Once this number is known, the total space in the memory stack required to store the state of the calling routine can be calculated. The number of set bits in the mask is used to determine, with the contents of the stack pointer register, the last location in the stack. Each general purpose register identified from the mask as a register that is to be saved, has its contents written into the memory stack.

In the prior art, the procedure for determining available memory space and for identifying registers that are to be saved is accomplished by microcode. However, the use of microcode to perform the mask data processing necessary for execution of a procedure call instruction requires excessive computer clock cycles. For example, the microcode must look at each bit of the entry mask to determine if it is set or clear and thus wastes cycles processing bit locations which are not set. This has a deleterious effect on processor performance which is not acceptable in modern high speed computer systems particularly when subroutines are used frequently. Further, there are several similar instructions, besides the procedure call and return instructions, which can use logic to reduce computer clock cycles and effectively boost performance.

SUMMARY OF THE INVENTION

The present invention provides a normalizer that reduces the number of clock cycles needed to identify general purpose registers that are to be saved and to determine accessibility of memory space required to store the contents of the identified general purpose registers. Generally, the normalizer of the present invention is a device arranged to receive an n-bit signal, which, in a preferred embodiment, is the entry mask. Each of the bits of the n-bit signal is either set or clear and the normalizer operates to generate a series of signals, one signal for each set bit of the n-bit signal wherein each of the generated signals represents position information of a particular set bit relative to the other bits of the n-bit signal. The normalizer operates iteratively, and during each iteration (or clock cycle), the following operations are all performed. An end most (most significant or least significant) set bit is determined; a signal representing position information for this end most set bit is generated; and the end most set bit identified during the previous iteration is cleared. The end most set bit for a particular iteration will be the set bit most closely adjacent to the set bit which was cleared during the immediately previous iteration. In other words, a previously determined end most set bit is cleared, and the position of the next end most bit that is set is determined during each cycle.

Thus, if m of the n-bits of the incoming signal are set, it will take m iterations to generate m position information signals, one for each of m set bits of the n-bit signal. This will minimize the number of clock cycles which are required to identify the set bits of the incoming signal, e.g., an n-bit signal representing the entry mask of a called procedure or subroutine. Each position information signal output by the normalizer corresponds to the address for locating the corresponding general purpose register to be saved during the procedure such that the microcode can use this position information to load the contents of each of the identified general purpose registers into the call frame of the memory stack.

A bit counter receives the same initial mask that the normalizer receives in order to determine the memory space needed to store the contents of the registers. This is done by counting the number of set bits in the mask. This counting of the number of bits in the mask field is performed by a novel bit counter. The bit counter of the present invention reduces the number of logic gates ordinarily needed to count the number of bits set for a given data input.

DETAILED DESCRIPTION

Figures 1, 2:
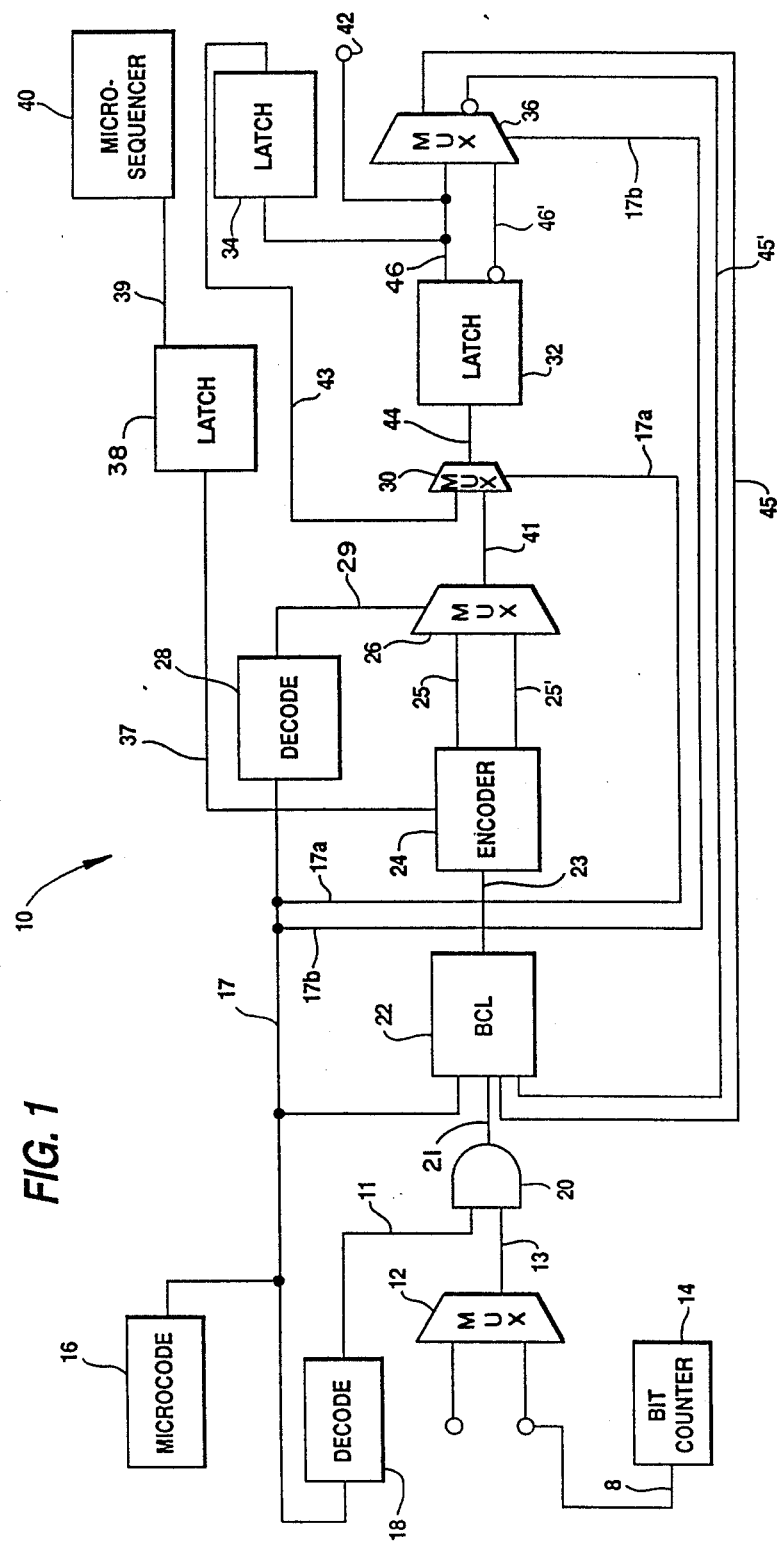
FIG. 1 illustrates a schematic diagram of a normalizer constructed in accordance with an embodiment of the present invention.
FIG. 2 shows a portion of the bit clear logic used in the normalizer of FIG. 1.

FIG. 1 illustrates a normalizer 10, constructed in accordance with an embodiment of the present invention. The normalizer 10 determines the position of set bits in an n-bit input data line 8. For example the date line 8 may comprise 32 bit data lines wherein each of the data lines can correspond to one of the bits of a mask. The normalizer 10 generates a series of multiple bit binary coded output signals on line 42, each output signal identifying the location of a bit set in the mask. An example of such a mask is shown below:

swapped" set, and so on until the least significant bit of the set becomes the most significant "bit swapped" set.

In accordance with the invention, a 32 bit signal on input data line 13 is input to a combination logic device 20. A decoder 18 is connected via line 17 to a latch 16 which provides microcode to control the operation of the combination logic device 20. The decoder 18 has an output line 11 connected to an input of the combination logic 20. The decoder 18 output includes a zero signal controlled by microcode. When asserted, the zero signal output by the decoder 18 causes the combination logic 20 to clear selected bits of the 32 bit input signal. The reason that certain bits are cleared is so that the general purpose registers corresponding to the cleared bits are not pushed on or popped from the stack, as may be required by the architecture of the computer system.

The bits output from the combination logic 20 are sent via a 32 bit signal line 21 to a bit clear logic device 2, with certain bits either cleared or not cleared depending on the zero signal to combination logic device 20. The first time that the 32 bit signal passes through the bit clear logic device 22, no manipulation of the signal is performed. However, in subsequent cycles, a specific bit of the signal is cleared, as will be described later. The operation of the bit clear logic device 22 is controlled by microcode provided by the latch 16 from line 17.

The output of the bit clear logic device 22 is input by line 23 to an encoder 24. The encoder 24 is a standard device that can encode thirty-two inputs to a binary coded output, which in the exemplary embodiment is a five bit output signal. However, encoders can be used that have different numbers of inputs and output bits. The coded output signal of the encoder 24 in the illustrated embodiment represents the position of the lowest order set bit of the 32 bit input signal on line 23, i.e., the encoder 24 is a trailing-1 encoder. The output signal of the encoder 24 is output on line 25 which is connected to one input of a multiplexer 26. A complement signal of the output signal of encoder 24 is output on line 25' which is connected to another input of the multiplexer 26.

The first set of bits is used when the encoder 24 is to act as a trailing-1 encoder, while the bit swapped set is used when the encoder 24 is to act as a leading-1 encoder. If the data input is bit swapped in one iteration BIT $\quad\backslash_3\ \backslash_3\ \backslash_2\ \backslash_2\ \backslash_2\ \backslash_2\ \backslash_2\ \backslash_2\ \backslash_2\ \backslash_2\ \backslash_2\ \backslash_2\ \backslash_1\ \backslash_1\ \backslash_1\ \backslash_1\ \backslash_1\ \backslash_1\ \backslash_1\ \backslash_1\ \backslash_1\ \backslash_1\ \backslash_0\ \backslash_0\ \backslash_0\ \backslash_0\ \backslash_0\ \backslash_0\ \backslash_0\ \backslash_0\ \backslash_0\ \backslash$ $\backslash_1\ \backslash_0\ \backslash_9\ \backslash_8\ \backslash_7\ \backslash_6\ \backslash_5\ \backslash_4\ \backslash_3\ \backslash_2\ \backslash_1\ \backslash_0\ \backslash_9\ \backslash_8\ \backslash_7\ \backslash_6\ \backslash_5\ \backslash_4\ \backslash_3\ \backslash_2\ \backslash_1\ \backslash_0\ \backslash_9\ \backslash_8\ \backslash_7\ \backslash_6\ \backslash_5\ \backslash_4\ \backslash_3\ \backslash_2\ \backslash_1\ \backslash_0\ \backslash$ BIT STATES $\quad|\,0\,|\,0\,|\,0\,|\,0\,|\,0\,|\,0\,|\,0\,|\,0\,|\,0\,|\,0\,|\,0\,|\,0\,|\,0\,|\,0\,|\,0\,|\,0\,|\,0\,|\,0\,|\,0\,|\,0\,|\,1\,|\,0\,|\,0\,|\,0\,|\,0\,|\,0\,|\,1\,|\,0\,|\,0\,|\,0\,|\,1\,|$ The mask shown above is a thirty-two bit mask, although it can be any length. Each bit that is set in the mask corresponds to a general purpose register that is to be saved. The normalizer 10 identifies the general purpose registers that need to be saved by identifying the bits that are set in the mask and generating an output signal representing the address or number of the corresponding general purpose register.

An input multiplexer 12 receives as inputs a set of bits from a source. Also, the multiplexer 12 receives this set in bit swapped order at its other input.

Bit swapped order is defined as the most significant bit of the set becoming the least significant bit of the "bit swapped" set, the next most significant bit of the set becomes the next to least significant bit of the "bit but not the next, the complement signal is used to clear the correct bit in the next cycle.

The encoder 24 also generates a BIT SET signal which indicates that at least one of the bits is set in the signal input to the encoder 24 on line 23. This BIT SET signal is sent on line 37 to a latch 38 and from there to a microsequencer 40 on line 39. If no bits of the signal on line 23 are asserted, the BIT SET signal is asserted to tell the microcode that no more bits are set, and hence, no more general purpose registers need to be pushed onto or popped off of the stack.

As indicated above, the signal on line 25, representing the coded output of the encoder 24, as well as the complement signal, on line 25', are sent to the multiplexer 26. The selection between the coded signal and the complement of the coded signal is controlled by a decoding of microcode bits provided by a decoder 28 connected to the select input 29 of the multiplexer 26. As illustrated, the decoder 28 is connected to line 17 which provide the output from microcode latch 16. The output signal produced by the multiplexer 26 is connected to an input of a multiplexer 30 by line 41. A second input to the multiplexer 30 is connected to a latch 34 by line 43.

The selection between the two inputs of the third multiplexer 30 is controlled by a microcode control bit received from line 17a. The output of the third multiplexer 30 is then sent to a latch 32 on line 44. The output of the latch 32 is the actual data that is sent out from output line 42 and comprises a five bit binary coded signal representing the position of one of the general purpose registers to be saved. The normalizer 10 illustrated in FIG. 1 operates through iterations, as will be described below, to provide a series of five bit binary coded signals for identification of the several general purpose registers to be saved.

The coded binary signal output and its complement from the latch 32 are also input on lines 46, 46' to a multiplexer 36. The choice of output of the multiplexer 36 is controlled by a microcode control bit from line 17b. The multiplexer 36 thus selects as its output either the binary signal output or its complement. The output of the multiplexer 36 is fed back as an input to the bit clear logic device 22 along line 45. The complement of the selected signal is generated in the multiplexer 36 and A brief description of the overall operation of the normalizer 10 as shown in FIG. 1 now follows. As discussed above, When a subroutine is to be entered from a main program, the state of the processor at the time the subroutine is entered is stored. Some of the state that is to be stored are the contents of certain general purpose registers identified by set bits of the entry mask. Upon a procedure call, the entry mask is connected to the device 20 by the 32 bit signal lines 13 through multiplexer 12.

The mask is also sent to a bit counter 14 which counts the number of bits that are set in the mask. The bit counter 14 is used to calculate the last location of the stack that is to be written, to determine if there is available memory space. In the illustrated embodiment, the stack location corresponds to the number of bits set in the mask, multiplied by the size of these registers, plus a constant value to provide for the registers which are always pushed onto the stack. If the determined stack location is not writable, then an exception is taken which is handled by the operating system of the processor. When writing of the registers to the stack starts, the data is pushed onto the stack in descending order of the address values of the stack locations. More detail regarding the bit counter 14 will be provided later.

As stated before, the bits which are set in the mask represent the general purpose registers that are to be saved. Thus, if bits [0,4,10] are set in the signal on line 21, then general purpose registers (0,4, and 10) are to be saved. An example of a mask signal is shown below.

| BIT | 3 | 3 | 2 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|---|
|  | 1 | 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| BIT STATES | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 1 | is also fed back to an input of the bit clear logic device on line 45'. The signal which is fed back by line 45 represents that bit of the input signal on line 21 which is to be cleared during the next cycle by the bit clear logic device 22. The signal on line 45 is the bit position signal. The complement of the bit position signal, on line 45', is used to provide the bit clear logic device 22 with identification information. The signal on line 23 comprises the 32 bit signal with the end most bit encoded by the encoder 24 during a previous iteration cleared by the bit clear logic device 22 in accordance with the binary coded signal fed back on line 45 and its complement.

The coded binary signal output from latch 32 is also sent to the latch 34, the output of the latch 34 being connected as an input to the multiplexer 30 as described above, by line 43. In the multiplexer 30, when new valid data is being encoded in the encoder 24, the coded binary signal of the encoder 24 will be the output data of the multiplexer 30. Otherwise, the input from the latch As one can see, the set bits in the mark are at bit positions [0,4,10]. The five digit binary equivalent of the set bit positions are: 0=00000, 4=00100, 10=01010.

The signal on line 21 passes unmanipulated through bit clear logic device 22 on a first cycle of the operation of the normalizer 10. The encoder 24 identifies bit zero as having the first bit set. In this example, the encoder 24 is used as a trailing-1 encoder. The output signal is set to 00000, as the binary coded signal of the encoder 24 on line 25. This encoded position signal is fed back to the bit clear logic 22 on line 45. The five bit (00000) signal is also output on line 42 to identify and store the contents of general purpose register 0.

On the second pass or iteration of the mask signal through the bit clear logic device 22, the bit indicated by the coded binary signal, fed back on line 45 from the previous iteration which identified bit 0, is cleared by the bit clear logic device 22 so that the output of the bit clear logic 22 device on line 23 is now as follows:

| BIT | 3 | 3 | 2 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|---|
|  | 1 | 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| BIT STATES | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 0 |

34 is selected to be the output data from the multiplexer 30.

Note that bit zero is now zero in the mask signal input to the encoder 24. The encoder 24 will now identify bit [4] as the next bit set so that the coded binary signal will now be 00100. As before, the coded binary signal is fed back to the bit clear logic device 22 on line 45 such that on the next cycle of the normalizer, bit [4] will be cleared and the output of the bit clear logic device 22 is now as follows:

output 69 is a 1 while a BIT-TO-SET L output 71 is a 0. If any of the inputs to AND gate 56 are not asserted, then BIT-TO-SET H is 0 and BIT-TO-SET L is 1. A BIT-TO-SET H output of 1 will clear the set bit in position 5 of the bit clear logic's 32 output signals on line 23.

| BIT | 3 | 3 | 2 | 2 | 2 | 2 | 2 | 2 | 2 | 2 | 2 | 2 | 1 | 1 | 1 | 1 | 1 | 1 | 1 | 1 | 1 | 1 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|---|
|  | 1 | 0 | 9 | 8 | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| BIT STATES | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |

After this pass through the bit clear logic device 22, the entry mask data only has a bit set at bit [10]. The same procedure continues through one more iteration to clear bit [10]. Once all the bits have been cleared with no remaining set bits, the output position signal is 00000. To clarify between this state and the state indicated by a bit set in bit position [0], the BIT SET signal on line 37 is deasserted.

In the above example, the least significant bit (bit [0]), is identified in the first clock cycle, bit [4] in the second clock cycle, and bit [10] in the third clock cycle. Thus, regardless of which bits are set, it takes only one cycle to determine each set bit, with all of the set bits being identified in successive clock cycles.

During the above operation, each time a set bit is identified, the position of this bit is passed as a coded position output signal via output line 42 to a register file unit to be used as a pointer into the general purpose registers. This pointer is used to generate the address of the general purpose register that is to be stored on a stack with microcode control. As long as there is a bit set in the mask, the microcode loops and writes to the stack continuously. The writing to the stack stops after BIT SET is deasserted, indicating then that there are no longer any valid bits in the mask.

A portion of the bit clear logic 22 is shown in FIG. 2. Illustrated is the portion of logic that will clear or set bit [5]. In the bit clear logic 22, there are thirty-two such arrangements in the illustrated embodiment one for each bit of the 32 bit signal on line 21, but only the arrangement for bit [5] is shown for purposes of explanation.

An AND gate set 52 has two AND gates 54 and 56. The first AND gate 54 receives as inputs certain of the bits of the coded binary signal and the complement thereof. For example, the position of bit [5] is equal to 00101, so that the coded binary signal fed back by line 45 is 00101, and the complement signal is 11010. The first input 61 of the AND gate 54 is the least significant bit [0] of the coded binary signal. The second input 62 of AND gate 54 receives bit [1] of the complement of the coded binary signal, the third input 63 of AND gate 54 receives bit [2] of the coded binary signal and the fourth input 64 receives bit [3] of the complement signal. If each of these bits is asserted, that means that the four bits of the position signal is equal to 0101 (bit position [5]), so that the AND gate 54 generates a high output.

Figure 3:
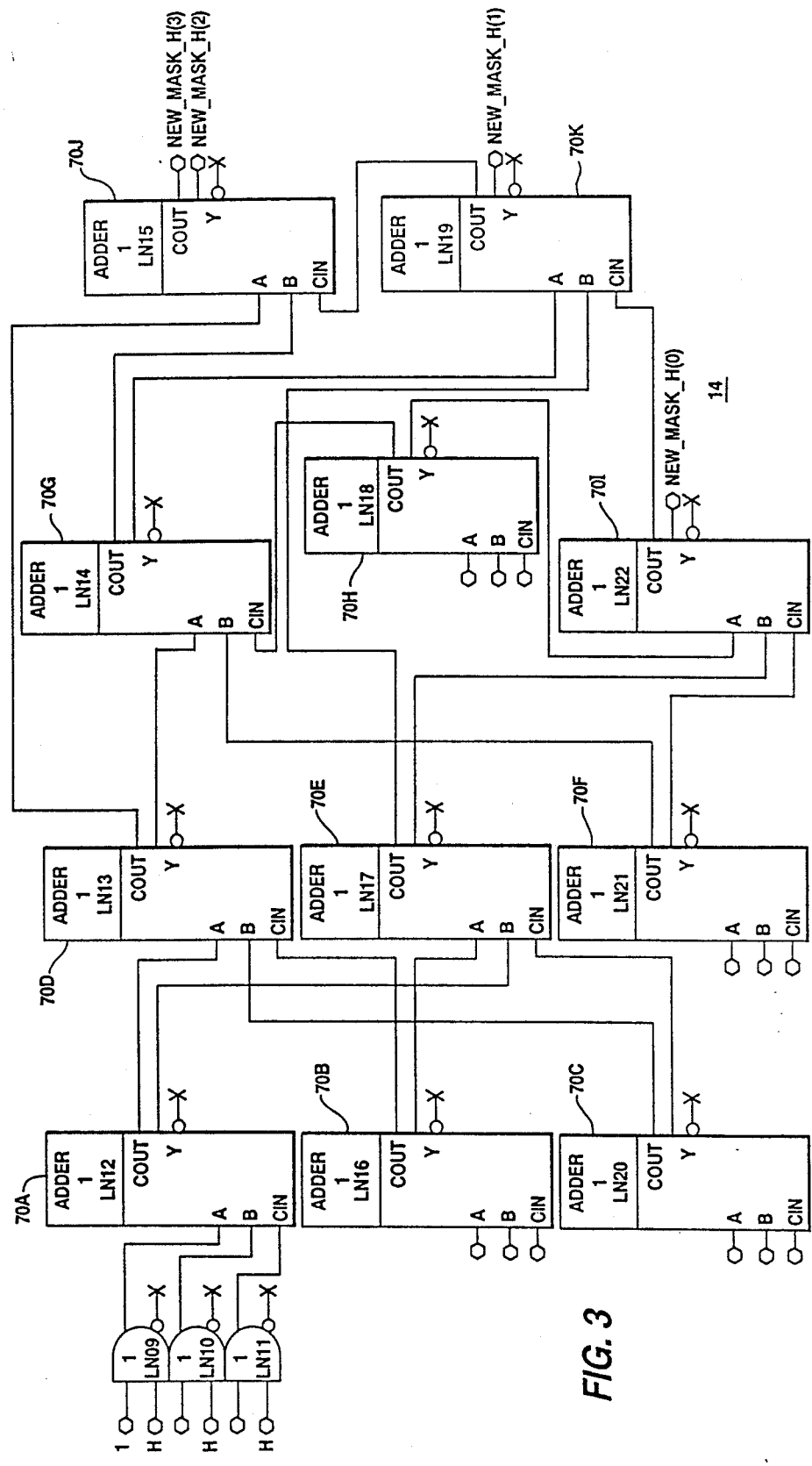
FIG. 3 shows in more detail the bit counter of FIG. 1 constructed in accordance with an embodiment of the present invention.

This output of the AND gate 54 is connected to the first input of the second AND gate 56. The most significant bit, bit [4], of the complement signal is received at the second input 66 of AND gate 56. A microcode command bit is received at a third input 67 of the second AND gate 56, and a fixed 1 appears at a fourth input 68 of the AND gate 56. When all four inputs to the AND gate 56 are high, then a BIT-TO-SET H The total number of registers that needs to be saved or pushed onto the stack must be known in order to assure that memory space is accessible for writing to the stack. This is performed by the bit counter 14 which counts the number of set data lines in the mask. Although a number of different counters could be used, an exemplary embodiment of the counter 14 is illustrated in FIG. 3. The counter 14 has eleven adders 70 that are interconnected. For purposes of description, these eleven adders 70 have been given subscripts A–K. Adders 70A, 70B, 70C, 70F, and 70H each receive different sets of three bits of the fifteen bits of the mask.

The three most significant bits of the mask can be cleared when a twelve-bit field is called for. For this purpose, AND gates 72 are used having as inputs the three most significant bits of the mask, and a write enable input. The AND gates 72 only output the three most significant bits to adder 70A when the write enable bit is asserted. This write enable bit is decoded from a microcode control field.

The fifteen (or twelve) bits of the mask are counted and this count is output as a four-bit mask size. The least significant bit of the mask size is an output of adder 70I, the next least significant bit of the mask size is an output of adder 70K. The two most significant bits of the four-bit mask size are the outputs of adder 70J.

The mask size is latched for future reference by the microcode. The latched value will not change until the microcode indicates that a new calculation is to be done.

This four-bit mask size signal is added with a constant to provide a number of entries that are to be pushed onto the stack. A constant is added since certain information must always be pushed onto the stack. From the mask size plus the constant, the last location of the stack that is to be written is calculated. The writability of this last entry of the stack is tested to assure that all of the space can be used. If this last entry of the stack is not writable, the instruction is aborted.

Since the location of the last entry of the stack is known, the stack can be written in reverse order, that is, from a so-called bottom of the stack upward toward the so-called top of the stack. This allows writing of thirty-two bits every cycle.

The actual adding operations of the counter 14 does not need to be described since its operation would be apparent from FIG. 3 to one of ordinary skill in the art, as conventional adders are used throughout the counter 14.

The use of the present invention is not limited to subroutine call instructions. The normalizer 10 of the present invention can be used for any operation within a computer, wherein a coded output for each set bit of an n-bit signal is to be generated.

What is claimed is:

1. A normalizer, comprising:

a data input which receives data;

bit clear logic connected to said data input to receive said data and having a bit position input which receives a bit position signal, said bit clear logic operating to manipulate a bit of said data specified by said bit position signal to produce a manipulated data signal;

an encoder connected to said bit clear logic to receive said manipulated data signal, said encoder producing a position signal which indicates the position of at least one of the most significant bit and the least significant bit that is set of said manipulated data signal, said position signal forming an output of said normalizer; and a feedback loop connected to an output of said encoder and said bit position input of said bit clear logic, said feedback loop receiving said position signal, and generating and feeding said bit position signal to said bit position input;

wherein said bit clear logic passes the data to said encoder unmanipulated on a first iteration of said data through said bit clear logic, and manipulates said data on subsequent iterations.

2. The normalizer of claim 1, further comprising a bit counter coupled to said data input to receive said data and operating to count bits that are set in said data and output a bit count signal to microcode indicating the number of bits that are set in said data.

3. The normalizer of claim 2, wherein said bit counter comprises a plurality of interconnected adders, with subsets of bits of said data being received as inputs to separate adders of said plurality of adders.

4. The normalizer of claim 1, wherein said manipulated data signal is an n-bit signal, and said position signal is an m-bit signal, where m is less than n with $n > 1$.

5. The normalizer of claim 4, wherein said bit position signal comprises said position signal and a complement of said position signal.

6. The normalizer of claim 5, wherein said bit clear logic comprises $2n$ sets of AND gates, with each AND gate set receiving different combinations of predetermined bits of said bit position signal such that each AND gate set responds to a different bit position signal to generate a bit manipulation signal to manipulate the bit specified by said bit position signal.

* * * * *